United States Patent
Guilbert et al.

(10) Patent No.: US 8,346,576 B2
(45) Date of Patent: Jan. 1, 2013

(54) APPARATUS, METHOD, PROGRAM AND COMPUTER-READABLE RECORDING MEDIUM FOR PROVIDING GUARANTEED MINIMUM ACCUMULATED BENEFIT CONTRACT FUNDED WITH MATCHING BOND INVESTMENTS

(75) Inventors: Daniel R. Guilbert, Simsbury, CT (US); David P. Wiland, South Windsor, CT (US); Xiaobo Zhou, Simsbury, CT (US); Jennifer Lynn Healy, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1055 days.

(21) Appl. No.: 12/266,821

(22) Filed: Nov. 7, 2008

(65) Prior Publication Data
US 2010/0030584 A1 Feb. 4, 2010

Related U.S. Application Data

(60) Provisional application No. 61/084,407, filed on Jul. 29, 2008.

(51) Int. Cl.
*G06Q 40/00* (2012.01)

(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 6,963,852 B2 | 11/2005 | Koresko | |
| 7,778,907 B1 * | 8/2010 | Haskins et al. | 705/36 R |
| 2002/0174045 A1 * | 11/2002 | Arena et al. | 705/36 |
| 2005/0216316 A1 * | 9/2005 | Brisbois et al. | 705/4 |
| 2008/0262977 A1 * | 10/2008 | Weiss et al. | 705/36 R |

* cited by examiner

*Primary Examiner* — Jessica Lemieux
(74) *Attorney, Agent, or Firm* — Buckley, Maschoff & Talwalkar LLC

(57) ABSTRACT

A guaranteed minimum accumulated benefit (GMAB) variable annuity contract management apparatus stores contract data on GMAB variable annuity contracts having a predetermined contract duration. The apparatus also stores fund data on amounts paid to purchase the contracts. The apparatus computes a portion of the amounts paid that is to be allocated to a bond fund. The apparatus stores data on the portion of the amounts paid to be allocated to the bond fund. A substantial portion, or all, of the bond fund is invested in bonds that have a maturity date that matches the contract duration of the GMAB variable annuity contracts.

28 Claims, 6 Drawing Sheets

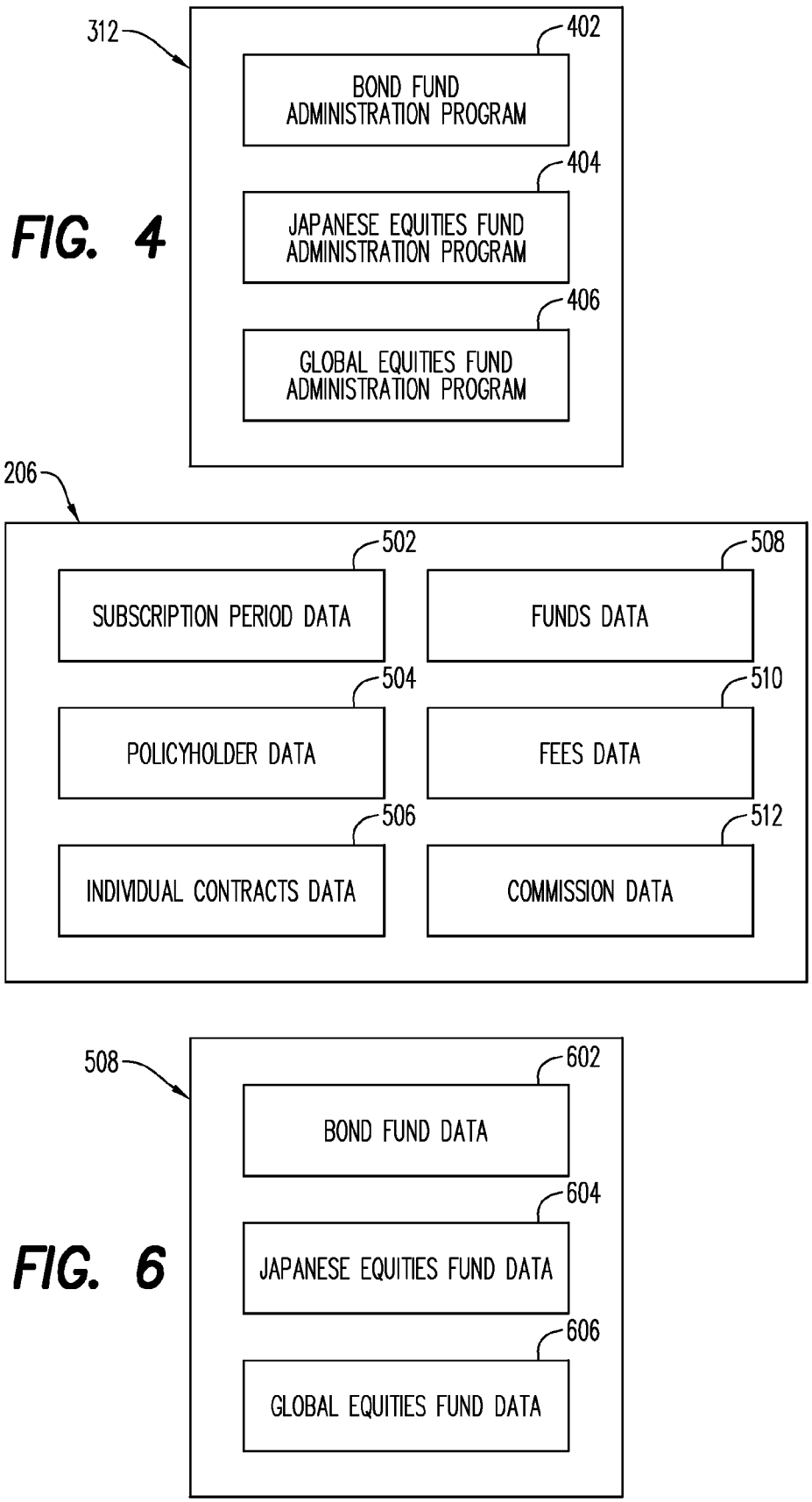

APPARATUS, METHOD, PROGRAM AND COMPUTER-READABLE RECORDING MEDIUM FOR PROVIDING GUARANTEED MINIMUM ACCUMULATED BENEFIT CONTRACT FUNDED WITH MATCHING BOND INVESTMENTS

CROSS-REFERENCE TO RELATED APPLICATION

This application claims the benefit of U.S. provisional patent application 61/084,407, filed Jul. 29, 2008, said provisional patent application being incorporated herein by reference.

FIELD

The present invention relates to a guaranteed minimum accumulated benefit (GMAB) variable annuity contract management apparatus, a GMAB variable annuity contract management method, a GMAB variable annuity contract management program, and a computer-readable recording medium for recording the GMAB variable annuity contract management program, for managing a GMAB variable annuity contract.

BACKGROUND

Variable annuity contracts are a known product offered by life insurance companies in the U.S. and in foreign countries, and may function as an investment vehicle. Variable annuity contracts have proved to be particularly attractive in Japan. One known feature of some variable annuity contracts is a guaranteed minimum accumulated benefit (GMAB). According to this feature, if the policyholder allows the contract to remain in force through its entire intended deferral period to maturity, the issuer of the contract agrees that the minimum payout of the contract at maturity is guaranteed to be at least a minimum amount. In some variable annuity contracts, the minimum amount is equal to the amount originally invested in the contract. The GMAB feature has proved to be attractive to Japanese investors, who typically are very concerned with preservation of capital, but who also may be interested in an opportunity to achieve some asset appreciation. Some variable annuity contracts allow the policyholder to set a growth target for the contract and to lock in the resulting profit if the growth target is reached.

The value of a variable annuity contract may vary according to the value of a special account that underlies a group of variable annuity contracts issued by the issuer. Conventionally, a large part of the assets in the special account are invested in an index bond fund. The present inventors have now recognized that an alternative investment approach may allow for issuance of GMAB variable annuity accounts with more favorable features that may be more attractive to potential investors than conventional GMAB variable annuity contracts.

Accordingly, an object of the present invention is to provide a GMAB variable annuity contract management apparatus, a GMAB variable annuity contract management method, a GMAB variable annuity contract management program, and a computer-readable recording medium for recording the GMAB variable annuity contract management program, for managing a GMAB variable annuity contract with an improved investment strategy for a special account that underlies an issue of GMAB variable annuity contracts.

SUMMARY

The above-mentioned object is achieved by a GMAB variable annuity contract management apparatus according to the present invention, which comprises a contract data storage unit for registering contract data on GMAB variable annuity contracts having a predetermined contract duration and entered into between policyholders and an insurance company during a subscription period; a fund data storage unit for registering fund data on amounts paid by the policyholders to purchase the contracts; a bond fund data processor for computing a portion of the amounts paid to be allocated to a bond fund; a bond fund data storage unit for registering data on the portion of the amounts paid to be allocated to the bond fund; and a bond purchase data storage unit for registering data on selected bonds having a maturity date that matches the predetermined contract duration of the GMAB variable annuity contracts and having an aggregate value that substantially matches the portion of the amounts paid to be allocated to the bond fund.

Thus, for an issue of GMAB variable annuity contracts having a 10-year deferral period, 60% of the special account for the GMAB variable annuity contracts may be invested in a bond fund largely or entirely made up of bonds having a 10-year maturity. For purposes of this disclosure and the appended claims, "substantially matching the portion of the amounts paid to be allocated to the bond fund" means having an aggregate value in the range of 60% to 100% of the portion of the amounts paid to be allocated to the bond fund. In a more specific example, in the case where the bond fund makes up 60% of the special account, "substantially matching the portion of the amounts paid to be allocated to the bond fund" means that the aggregate value of the 10-year maturity bonds is in the range of 36% to 60% of the special account. The bonds in the bond fund may be Japanese government bonds, and/or U.S. corporate bonds.

The duration of the GMAB variable annuity contracts may in alternative embodiments be in the range of 5 to 15 years. The amount of the special account allocated to the bond fund may in alternative embodiments be in the range of 40% to 60% of the total amount of the special account.

Preferably, the GMAB variable annuity contract management apparatus also includes an equity fund data processor for computing a portion of the amounts paid to be allocated to an equity fund; and an equity fund data storage unit for registering data on the portion of the amounts paid to be allocated to the equity fund; and the equity fund may comprise (a) a local equities fund in an amount that is preferably in a range of 10% to 30% of the total amount of the special account, and still more preferably is substantially equal to 15% of the total amount of the special account, and (b) a worldwide equities fund in an amount that is preferably in a range of 10% to 30% of the total amount of the special account, and still more preferably is substantially equal to 25% of the total amount of the special account. "Local equities" refers to common stocks or similar securities issued by corporations in the country in which the GMAB variable annuity contracts are issued, and "worldwide equities" refers to common stocks or similar securities issued by corporations outside of the country in which the GMAB variable annuity contracts are issued. In a preferred embodiment, the GMAB variable annuity contracts are issued in Japan and denominated in Japanese Yen.

Preferably, the GMAB variable annuity contract management apparatus also includes a target amount data processor for comparing an actual value of each of at least some of said contracts with a target amount designated by a respective policyholder under said each contract; and a contract shift data processor for responding to the target amount data processor by shifting said each contract to an annuity certain if the actual value of said each contract at least matches said target amount. The target amount may be in a range of 110% to 200% of an amount paid by the policyholder in question for the particular contract. The contract shift processor may shift each contract to an annuity certain only in a period of time from the halfway point in the duration of the contract to the maturity date of the contract.

Preferably, the GMAB variable annuity contract management apparatus also includes a guaranteed minimum benefit data processor for computing a guaranteed minimum benefit for said contracts on a tenth anniversary of said contracts, and the guaranteed minimum benefit may be 105% of an amount paid by the policyholder in question for the particular contract.

The constitution of the invention is such that the investment in bonds more closely matches the issuer's potential obligations under the contracts, thereby reducing risks for the issuer and enabling the issuer to offer more attractive contract terms.

The above-mentioned object is achieved by a GMAB variable annuity contract management method, comprising: a contract data storage step for registering, in a contract data storage unit, contract data on GMAB variable annuity contracts having a predetermined contract duration and entered into between policyholders and an insurance company during a subscription period; a fund data storage step for registering, in a fund data storage unit, fund data on amounts paid by the policyholders to purchase the contracts; a bond fund data processing step in which a bond fund data processor computes a portion of the amounts paid to be allocated to a bond fund; a bond fund data storage step for registering, in a bond fund data storage unit, data on the portion of the amounts paid to be allocated to the bond fund; and a bond purchase data storage step for registering, in a bond purchase data storage unit, data on selected bonds having a maturity date that matches the predetermined contract duration of the GMAB variable annuity contracts and having an aggregate value that substantially matches the portion of the amounts paid to be allocated to the bond fund.

The above-mentioned object is achieved by a GMAB variable annuity contract management program, comprising: a contract data storage step for registering, in a contract data storage unit, contract data on GMAB variable annuity contracts having a predetermined contract duration and entered into between policyholders and an insurance company during a subscription period; a fund data storage step for registering, in a fund data storage unit, fund data on amounts paid by the policyholders to purchase the contracts; a bond fund data processing step in which a bond fund data processor computes a portion of the amounts paid to be allocated to a bond fund; a bond fund data storage step for registering, in a bond fund data storage unit, data on the portion of the amounts paid to be allocated to the bond fund; and a bond purchase data storage step for registering, in a bond purchase data storage unit, data on selected bonds having a maturity date that matches the predetermined contract duration of the GMAB variable annuity contracts and having an aggregate value that substantially matches the portion of the amounts paid to be allocated to the bond fund.

The above-mentioned object is achieved by a computer-readable recording medium on which is recorded a GMAB variable annuity contract management program, the program comprising: a contract data storage step for registering, in a contract data storage unit, contract data on GMAB variable annuity contracts having a predetermined contract duration and entered into between policyholders and an insurance company during a subscription period; a fund data storage step for registering, in a fund data storage unit, fund data on amounts paid by the policyholders to purchase the contracts; a bond fund data processing step in which a bond fund data processor computes a portion of the amounts paid to be allocated to a bond fund; a bond fund data storage step for registering, in a bond fund data storage unit, data on the portion of the amounts paid to be allocated to the bond fund; and a bond purchase data storage step for registering, in a bond purchase data storage unit, data on selected bonds having a maturity date that matches the predetermined contract duration of the GMAB variable annuity contracts and having an aggregate value that substantially matches the portion of the amounts paid to be allocated to the bond fund.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 4 is a simplified diagram showing programs included in the funds administration programs in the program storage unit of FIG. 3.

FIG. 5 is a simplified diagram showing data inside the GMAB contracts data storage unit in the GMAB variable annuity contract management apparatus of FIG. 2.

FIG. 6 is a simplified diagram showing data included in the funds data included in the GMAB contracts data storage unit of FIG. 5.

DETAILED DESCRIPTION

The present inventors have recognized a manner of improving GMAB variable annuity contracts. According to aspects of the present invention, the investments underlying the contracts include a substantial portion allocated to bonds that match the duration of the contract. With this mitigation of risk to the issuer of the contract, improved terms may be offered to the policyholders.

The present invention proposes a GMAB contract with a duration of ten years. The type of contract is a GMAB Variable Annuity with Target Setting Function.

The Special Account underlying the contract may include a 40% allocation of assets to a Balanced Equity Fund and a 60% allocation of assets to a Stable Bond Fund. Details of both funds will be provided below. Alternatively, the Special Account may be allocated to the Stable Bond Fund in a proportion of 40% to 60% of the total of the Special Account, and may be allocated to the Balanced Equity Fund in a proportion of 40% to 60% of the total of the Special Account.

The main hardware configuration of a GMAB variable annuity contract management apparatus 100 in accordance with the invention will be explained hereinbelow using FIG. 1.

The embodiments described hereinbelow are specific examples suitable for the present invention, but the scope of the present invention is not limited to these aspects.

Figure 1:
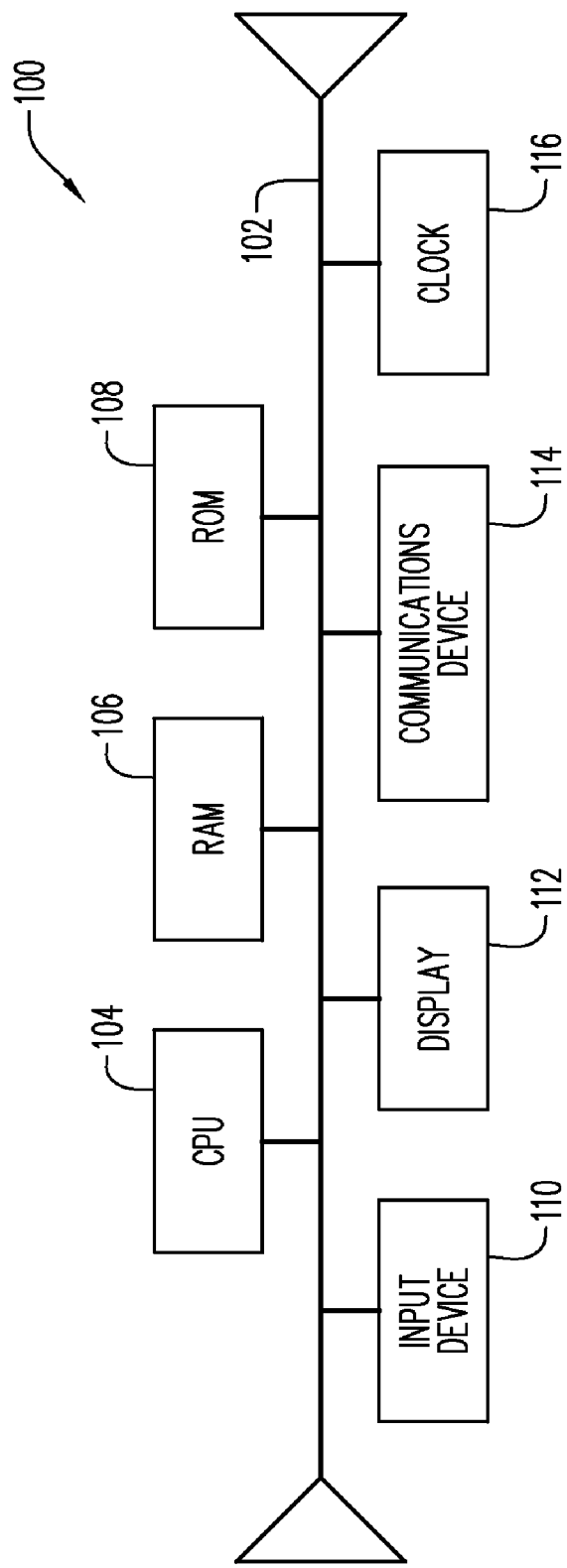
FIG. 1 is a simplified diagram showing a GMAB variable annuity contract management apparatus according to the present invention.

Referring then to FIG. 1, the GMAB variable annuity contract management apparatus 100 may be formed of conventional computer hardware (not separately indicated) that includes a bus 102. The bus 102 connects a CPU (Central Processing Unit) 104, RAM (Random Access Memory) 106, and ROM (Read-Only Memory) 108.

Further, for example, there are also connected to the bus 102: a keyboard or other such input device 110 for a user of the GMAB variable annuity contract management apparatus 100 to input information related to the GMAB variable annuity contracts; a display 112 which is a display unit for displaying various information; and a communication device 114, which is an information transmission unit for carrying out communications with other devices (not shown). A clock 116 is also connected to the bus 102.

The bus 102 has functions for connecting all of these devices, and is an internal path having address and data paths.

The CPU 104, in addition to executing one or more programs, also controls the ROM 108. The ROM 108 stores assorted programs and various types of information.

RAM 106 has functions for comparing and contrasting the contents of memory during the processing of a program and for serving as a program execution area.

Figure 2:
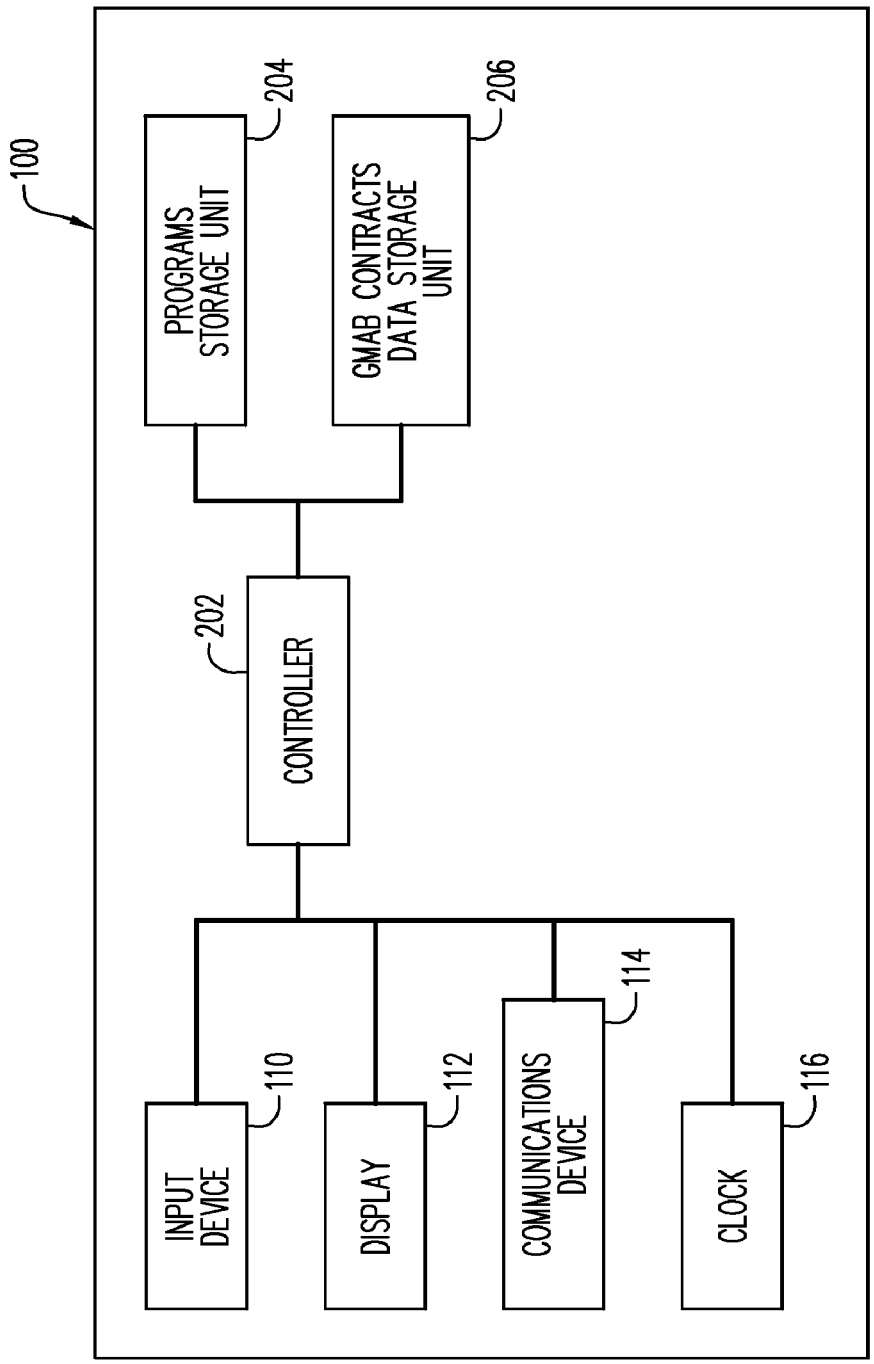
FIG. 2 is a simplified diagram showing the main functional blocks of the GMAB variable annuity contract management apparatus.

FIG. 2 is a simplified diagram showing the main functional blocks of the GMAB variable annuity contract management apparatus 100.

Referring to FIG. 2, the GMAB variable annuity contract management apparatus 100 includes a controller 202 (which may be at least partially constituted by the CPU 104 discussed above). The controller 202 executes various types of programs stored in the programs storage unit 204, and processes various types of data stored in the GMAB contracts data storage unit 206. In FIG. 2, the programs storage unit 202 and the GMAB contracts data storage unit 206 are shown separately, but in practice both may be constituted by a single device or group of devices that may be a mass storage device such as a hard disk drive or the like.

Figure 3:
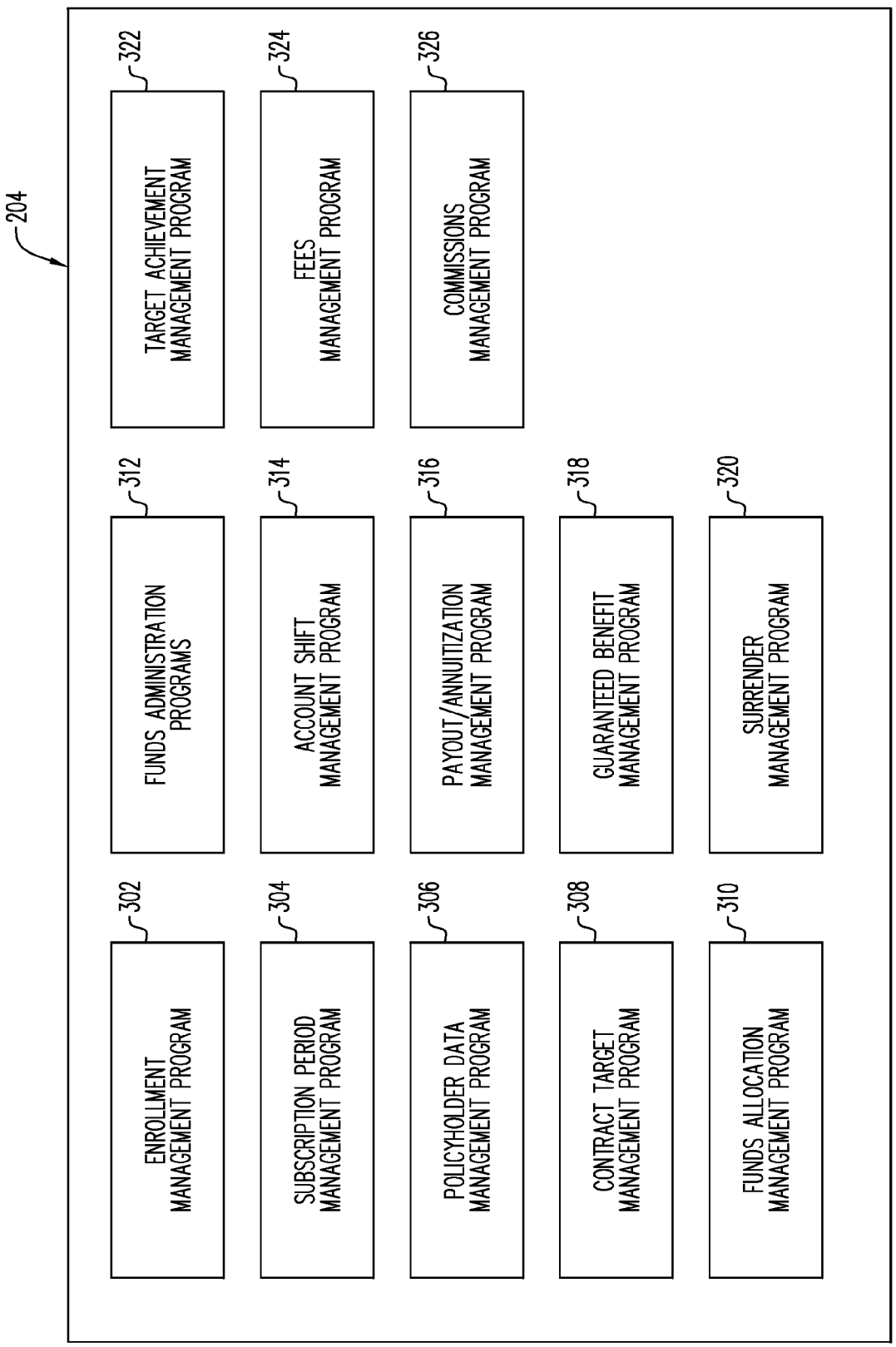
FIG. 3 is a simplified diagram showing programs inside the programs storage unit in the GMAB variable annuity contract management apparatus of FIG. 2.

FIG. 3 is a simplified diagram showing programs stored in the programs storage unit 204 in the GMAB variable annuity contract management apparatus 100.

The programs stored in the programs storage unit 204 include an enrollment management program 302. The enrollment management program 302 implements policies and procedures for enrolling policyholders for the GMAB variable annuity contract which is the subject of the present invention.

The programs stored in the programs storage unit 204 further include a subscription period management program 304. The subscription period management program 304 handles issuance of GMAB variable annuity contracts within a given subscription period. According to some embodiments of the invention, each subscription lasts six months. All the GMAB variable annuity contracts issued within a given subscription period may form a single cohort to be funded with a single special account shared by the GMAB variable annuity contracts in the cohort. At the end of each subscription period a new subscription period may commence for the next cohort of GMAB variable annuity contracts.

The programs stored in the programs storage unit 204 also include a policyholder data management program 306. The policyholder data management program 306 may process and keep track of data that identifies the policyholders of the GMAB variable annuity contracts.

In addition, the programs stored in the programs storage unit 204 include a contract target management program 308. The contract target management program 308 supports the policyholders' selection of growth targets for their GMAB variable annuity contracts and stores the resulting growth target information for the GMAB variable annuity contracts.

Still further, the programs stored in the programs storage unit 204 include a funds allocation management program 310. The funds allocation management program 310 keeps track of the amounts paid in for issuance of the GMAB variable annuity contracts for the current subscription period, and allocates the amounts paid in among the three funds that make up the special account underlying the current cohort of GMAB variable annuity contracts. As noted above, the three funds are, in one embodiment, a Bond Fund, a local equities fund, and a worldwide equities funds. In one embodiment, the three funds are in the proportions 60%, 15% and 25%, respectively, but other asset allocations are also possible, as described above. In one preferred embodiment, the GMAB variable annuity contracts are issued in Japan, the local equities fund is implemented as a Japanese Equities Fund, and the worldwide equities fund holds equity securities issued outside of Japan and is denominated a "Global Equities Fund".

Moreover, the programs stored in the programs storage unit 204 include funds administration programs 312. The funds administration programs 312 may select and/or implement user selections of particular assets (bonds or equity securities, as the case may be) for the constituent funds for the special account. The funds administration programs 312 may also store and keep track of information that reflects the assets held in the funds.

Also, the programs stored in the programs storage unit 204 include an account shift management program 314. The account shift management program handles the shifting of each contract from the special account to the issuer's general account. This may take place either upon expiration of the deferral period, or alternatively, if the policyholder selected a growth target and the target was achieved, the contract may be shifted from the special account to the general account immediately after achievement of the growth target. In one embodiment, where the deferral period is ten years, the shift may occur prior to expiration of the deferral period only if the growth target for the contract is achieved at some point between the fifth and tenth anniversaries of issuance of the contract. More generally, the deferral period may be set in the range of 5 to 15 years, and the shift may occur at a point at or after halfway through the deferral period.

The programs stored in the programs storage unit 204 further include a payout/annuitization management program 316. The payout/annuitization management program 316 manages disbursement of the proceeds of the contract upon shifting of the contract from the special account to the general account, and supports the policyholder's selection of either a lump sum payout or an annuitized payment, at the policyholder's election.

The programs stored in the programs storage unit 204 also include a guaranteed benefit management program 318. The guaranteed benefit management program 318 tracks the actual value (AV) and the base insurance amount (BIA) for each contract to assure that the guaranteed benefit payable under the contract is paid upon either expiration of the contract or death of the policyholder, if either of these events should happen to occur. It will be noted that neither of these events may come into play in the event of prior surrender of the entire contract, or prior shifting of the contract upon achievement of the growth target.

Still further, the programs stored in the programs storage unit 204 include a surrender management program 320. The surrender management program 320 handles partial or full surrenders of the contracts by the policyholders.

The programs stored in the programs storage unit 204 further include a target achievement management program 322. During a selected period of the life of each contract (e.g., from the fifth to the tenth anniversaries of the contract), the target achievement management program 322 tracks whether the growth target (if any) selected by the policyholder has been achieved, by comparing the selected growth target with the current accumulated rate of growth of the special account.

In addition, the programs stored in the programs storage unit 204 include a fees management program 324. The fees management program 324 manages fees to be charged to the policyholders in accordance with the fee provisions of the GMAB variable annuity contracts.

Further, the programs stored in the programs storage unit 204 include a commissions management program 326. The commissions management program 326 manages commissions that are payable to distributors of the GMAB variable annuity contracts and also refunds of commissions applicable in some cases where the policyholder elects partial or total surrender of the contract.

FIG. 4 is a simplified diagram showing programs included in the funds administration programs 312 in the program storage unit 204.

The funds administration programs 312 include a bond fund administration program 402, a Japanese Equities fund administration program 404 and a Global Equities fund administration program 406. The programs 402, 404, 406 select and/or implement user selections for the respective special account funds, and track and manage asset data for the special account funds.

FIG. 5 is a simplified diagram showing data stored in the GMAB contracts data storage unit 206 in the GMAB variable annuity contract management apparatus 100.

The data stored in the GMAB contracts data storage unit 206 includes subscription period data 502. The subscription period data 502 includes data that represents the cohort of GMAB variable annuity contracts issued in each subscription period, including at least data that identifies each contract issued in each cohort and the aggregate premiums paid for the contracts in the cohort.

The data stored in the GMAB contracts data storage unit 206 further includes policyholder data 504. The policyholder data 504 includes data that identifies the policyholder for each contract, and also includes contact information for the policyholders. Additional information about the policyholders, including gender, date of birth and other demographic information, may also be included in the policyholder data 504.

The data stored in the GMAB contracts data storage unit 206 also includes individual contracts data 506. The individual contracts data 506 includes, for each contract, details about the contract such as contract number, anniversary date, BIA, AV, growth target (if any) selected by the policyholder, an identification of the applicable policy form language, etc.

In addition, the data stored in the GMAB contracts data storage unit 206 includes funds data 508. The funds data 508 includes data that represents the assets held for each of the funds that make up the special account. Valuation data, data indicative of maturity dates (in the case of bonds) and other data relating to the funds assets may also be included in the funds data 508. In particular, the funds data 508 includes, as shown in FIG. 6, bond fund data 602 in regard to the Bond Fund; Japanese equities fund data 604 in regard to the Japanese Equities Fund; and global equities fund data 606 in regard to the Global Equities Fund.

Still further, and referring again to FIG. 5, the data stored in the GMAB contracts data storage unit 206 includes fees data 510, concerning fees payable to the issuer under the contracts, and commissions data 512, concerning commissions payable to distributors and/or refundable from distributors with respect to the contracts.

Figure 7:
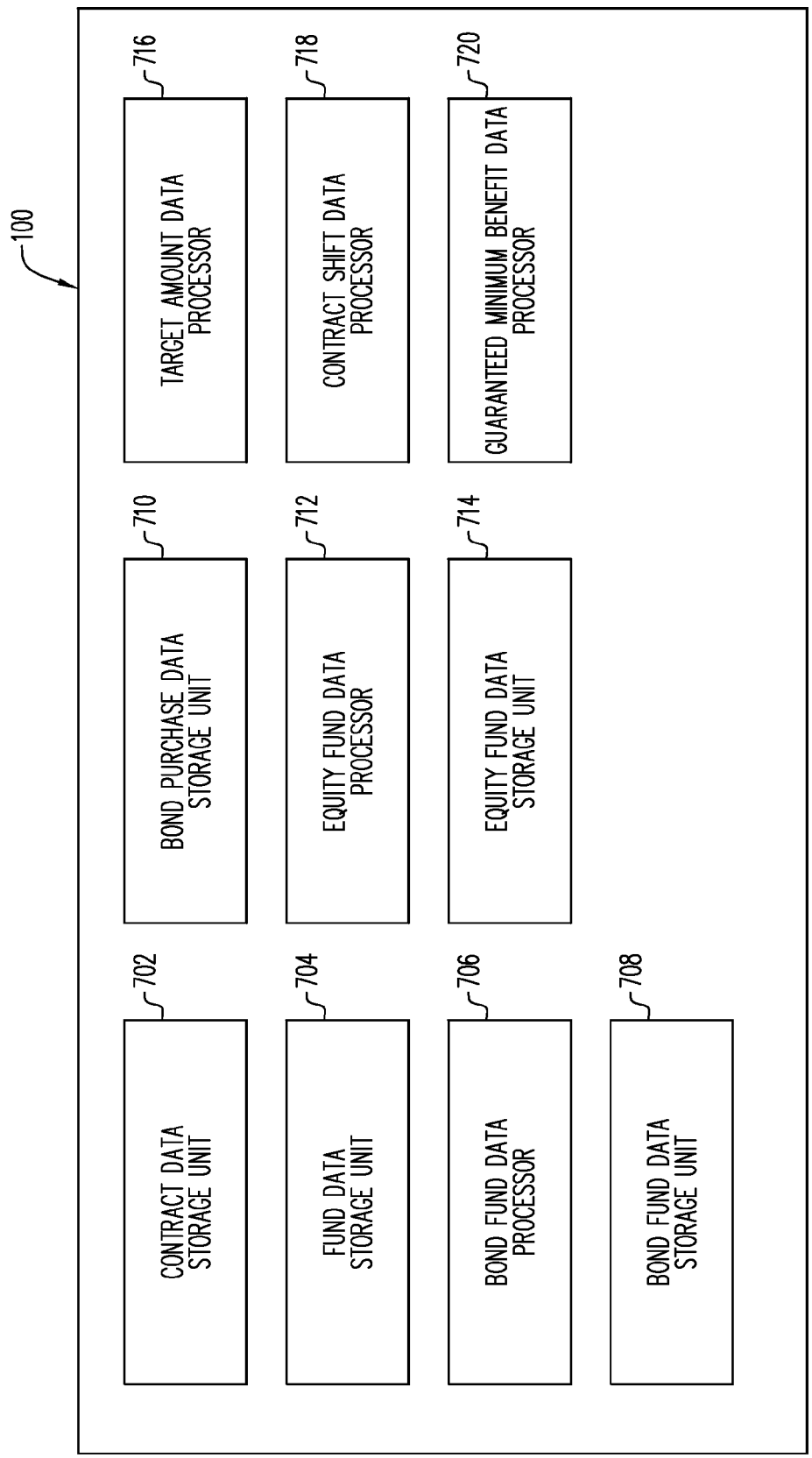
FIG. 7 is a simplified diagram showing functional aspects of the GMAB variable annuity contract management apparatus.

FIG. 7 is a simplified diagram showing functional aspects of the GMAB variable annuity contract management apparatus 100. The functional components of the GMAB variable annuity contract management apparatus 100, as represented in FIG. 7, may be constituted by the hardware, software and data aspects of the GMAB variable annuity contract management apparatus 100, as described above in connection with the drawing figures that precede FIG. 7.

The GMAB variable annuity contract management apparatus 100 includes a contract data storage unit 702. The contract data storage unit 702 stores contract data on the GMAB variable annuity contracts. The contracts have a contract duration—also referred to as the deferral period—which is ten years in one embodiment. The contracts are entered into between the policyholders and the issuer during a subscription period. The issuer may be a life insurance company.

The GMAB variable annuity contract management apparatus 100 further includes a fund data storage unit 704. The fund data storage unit 704 stores fund data on amounts paid by the policyholders to purchase the contracts.

The GMAB variable annuity contract management apparatus 100 also includes a bond fund data processor 706. The bond fund data processor 706 computes a portion of the amounts paid for the contracts that is to be allocated to the Bond fund. In one embodiment, the portion as computed by the bond fund data processor 706 is 60% of the amounts paid for the contracts.

In addition, the GMAB variable annuity contract management apparatus 100 includes a bond fund data storage unit 708. The bond fund data storage unit 708 stores data on the portion of the amounts paid for the contracts that is to be allocated to the Bond Fund.

Still further, the GMAB variable annuity contract management apparatus 100 includes a bond purchase data storage unit 710. The bond purchase data storage unit 710 stores data on the bonds selected to be held in the Bond Fund. In some embodiments, 60% to 100% (by aggregate value) of the bonds held in the Bond Fund may have maturities that match the deferral period of the contracts. Thus, if the deferral period is ten years, the bulk of the bonds held in the Bond Fund have maturities of about ten years.

In some embodiments, the assets held in the Bond Fund may include government bonds, certificates of deposit, banker's acceptances, freely transferable promissory notes, commercial paper, floating rate notes, debentures, preferred shares, asset backed securities, corporate bonds and mortgage backed securities. As used herein and in the appended claims, the term "bonds" refers to any or all of the types of assets listed in the preceding sentence.

In some practical embodiments, a target allocation of the Bond Fund may be: Government bonds—30%, AAA-rated bonds—15%, AA-rated bonds—15% and A-rated bonds—40%. Alternatively, government bonds may make up from 0% to 100% of the Bond Fund; AAA-rated bonds: 0-80%; AA-rated bonds: 0-80%; A-rated bonds: 0-80%; and BBB-rated bonds: 0-20%.

A target sector allocation may be 30% government bonds and 70% corporate, but alternatively may be: Government: 0-100%; corporate: 0-100%; asset backed securities 0-10%; commercial mortgage backed securities 0-10%; and mortgage backed securities 0-10%.

The Bond Fund may utilize financial derivative instruments to increase returns, manage risks and/or reduce costs.

Also, the GMAB variable annuity contract management apparatus 100 includes an equity fund data processor 712. The equity fund data processor computes a portion of the amounts paid for the contracts that is to be allocated to an equity fund. The GMAB variable annuity contract management apparatus 100 also includes an equity fund data storage unit 714. The equity fund data storage unit stores data on the portion of the amounts paid for the contracts that is to be allocated to the equity fund. The equity fund may be formed from the above-mentioned Japanese Equities Fund (corresponding to 15% of the amounts paid for the contracts) and the above-mentioned Global Equities Fund (corresponding to 25% of the amounts paid for the contracts).

Still further, the GMAB variable annuity contract management apparatus 100 includes a target amount data processor 716. The target amount data processor 716 compares the AV for each of the contracts (or at least for the contracts for which the policyholder selected a growth target) with the growth target. In addition, the GMAB variable annuity contract management apparatus 100 includes a contract shift data processor 718. The contract shift data processor 718 responds to the target amount data processor by shifting each of the contracts to an annuity certain if the AV for the contract at least matches the growth target. In one embodiment, the policyholder is permitted to select the growth target in the range of 120% to 200%, but other permitted target setting ranges, such as 110% to 200% may alternatively be featured. The shifting of the contract, in one embodiment, only occurs between the fifth and tenth anniversaries of the issuance of the contract.

The GMAB variable annuity contract management apparatus 100 also includes a guaranteed minimum benefit data processor 720. The guaranteed minimum benefit data processor 720 computes a guaranteed minimum benefit for the contracts on a tenth anniversary of the contracts. In some embodiments, the guaranteed minimum data processor 720 also computes a guaranteed minimum death benefit in the event that the policyholder dies prior to full surrender, expiration or shifting of the contract.

In one embodiment, the guaranteed minimum accumulated benefit paid upon expiration of the contract includes a 5% bonus calculated as a percentage of the greater of the AV and the BIA as of the time of expiration.

Figure 8:
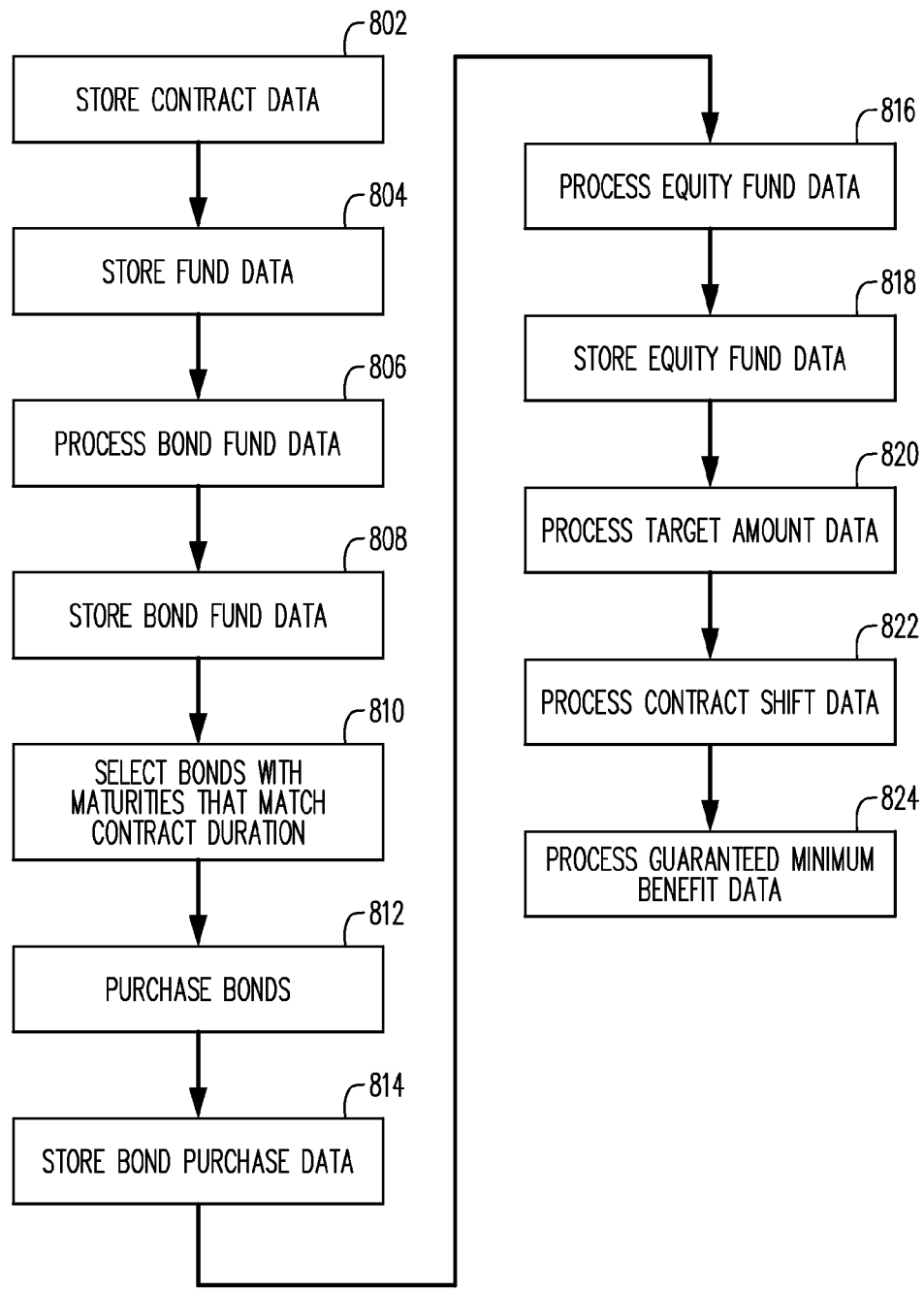
FIG. 8 is a simplified flowchart showing principal operations of the GMAB variable annuity contract management apparatus.

FIG. 8 is a simplified flowchart showing principal operations of the GMAB variable annuity contract management apparatus 100.

At 802 in FIG. 8, the GMAB variable annuity contract management apparatus 100 stores contract data. The contract data is related to GMAB variable annuity contracts that have a predetermined duration (e.g., a deferral period of 10 years). The GMAB variable annuity contracts are entered into, during a subscription period, between policyholders and the insurance company that operates the GMAB variable annuity contract management apparatus 100. The contract data is stored in the GMAB contracts data storage unit 206 (FIG. 2)

Continuing to refer to FIG. 8, at 804 the GMAB variable annuity contract management apparatus 100 stores fund data. The fund data is related to amounts paid by the policyholders to purchase the GMAB variable annuity contracts. The fund data, too, is stored in the GMAB contracts data storage unit 206.

At 806, the GMAB variable annuity contract management apparatus 100 processes bond fund data by computing a portion of the amounts paid by the policyholders that is to be allocated to the Bond Fund. As noted before, in one embodiment, 60% of the amounts paid are to be allocated to the Bond Fund, which thus makes up 60% of the special account.

At 808, the GMAB variable annuity contract management apparatus 100 stores the bond fund data in the GMAB contracts data storage unit 206. Again, the bond fund data, in one embodiment, indicates the 60% allocation of the special account to the Bond Fund.

At 810, the GMAB variable annuity contract management apparatus 100 selects bonds for acquisition for the Bond Fund. The bulk of the selected bonds (e.g., 60% to 100% of the selected bonds, by aggregate value) have maturities that match the duration—such as 10 years—of the GMAB variable annuity contracts.

At 812, the GMAB variable annuity contract management apparatus 100 purchases the selected bonds. (In some embodiments, the selection and purchasing of the bonds may be responsive to input from one or more individual users who are investment managers for the Bond Fund.).

At 814, the GMAB variable annuity contract management apparatus 100 stores in the GMAB contracts data storage unit 206 data that reflects the acquisition of the bonds for the Bond Fund.

At 816, the GMAB variable annuity contract management apparatus 100 processes equity fund data by computing a portion of the amounts paid by the policyholders that is to be allocated to one or more equity funds. As noted before, in one embodiment, 40% of the amounts paid are to be allocated to equities, with 15% of the special account invested in Japanese equities and 25% of the special account invested in global equities.

With respect to both bonds and equities, where the same are issued or traded in a foreign (in one embodiment, non-Japanese) currency, the GMAB variable annuity contract management apparatus 100 may engage in hedging transactions to substantially or completely hedge all exposure to currency fluctuations.

At 818, the GMAB variable annuity contract management apparatus 100 stores the equity fund data in the GMAB contracts data storage unit 206.

At 820, the GMAB variable annuity contract management apparatus 100 processes target amount data by comparing the AV for each contract (or at least for each contract for which the policyholder has selected a growth target) with the growth target selected for the contract by the policyholder. At 822, the GMAB variable annuity contract management apparatus 100 shifts each contract to an annuity certain if the AV at least matches the growth target. In some embodiments, the shifting of the contract to an annuity certain occurs only between the fifth and tenth anniversaries of the issuance of the contract.

At 824, the GMAB variable annuity contract management apparatus 100 processes guaranteed minimum benefit data by computing a guaranteed minimum benefit for the GMAB variable annuity contracts on the tenth anniversary of the contracts (assuming that a deferral period of 10 years is employed). If the policyholder dies before the tenth anniversary, and before shifting or surrender of the contract occurs, the GMAB variable annuity contract management apparatus 100 calculates a guaranteed minimum death benefit for the policyholder as of the time of his/her death.

In the particular examples described above, the deferral period is set at 10 years. Alternatively, however, the deferral period may be in the range of 5 to 15 years.

In the particular examples described above, the proportion of the fund of funds that is allocated to equities is 40%. Alternatively, the allocation to equities may be in the range of 35% to 60% with the allocation of the balance to bonds.

The above activities are all ascribed to the GMAB variable annuity contract management apparatus 100. However, in practice, these activities may be divided among a number of computers operated by or on behalf of the insurance company, its affiliates and retained and/or affiliated fund managers.

\* \* \*

Features of the GMAB contract include a death benefit guarantee (Guaranteed Minimum Death Benefit or "GMDB") and a living benefit guarantee (the above mentioned GMAB). A further feature is an Annuity Fund in case the actual value (AV) of the contract does not reach the target value, with the Base Insurance Amount (BIA) at the day before the Annuity Commencement Date (ACD) increased by 5% to refund the front end load.

Another feature is locking in of a profit upon reaching of the investment target.

The contract includes a front end load (FEL) of, e.g., 5%, but no contingent deferred sales charge (CDSC).

Another feature is the above-mentioned Bond Fund (also referred to as the "Stable Bond Fund").

\* \* \*

In some embodiments, the GMAB contract described herein may be issued and marketed in Japan.

The age of the policy holder at the time of issuance of the contract may be from 0 to 80 years old.

The deferral period of the contract may be 10 years.

The premium may be paid as a single up front premium.

It may be required that the policyholder be the insured and the annuitant under the contract.

The investment account for the contract may be the herein-described Special Account before the date of shifting to Annuity, and after the shift date the investment account may be the issuer's General Account.

The Base Insurance Amount (BIA) at the time of contract issue may equal the single premium. In case of Partial Surrender, the BIA after a Partial Surrender may=(BIA before Partial Surrender×{1−(Claimed partial surrender amount÷Account Value (AV) before Partial Surrender)}). In case of a Partial Surrender before the premium is transferred to the Special Account, then the BIA after a Partial Surrender=(BIA before Partial Surrender−Claimed partial surrender amount).

The minimum BIA at contract issue may be 2,000,000 yen.

The maximum BIA under all policies per insured may be 500,000,000 yen, with a maximum BIA for one policy of 300,000,000 yen.

According to a "cooling off" feature, the issuer may allow a rescission of an application or a cancellation of a contract if such a request is sent to the issuer within eight days counting the application date as day one. In such a case, the single premium or the amount equivalent to the single premium will be repaid to the policyholder.

In some embodiments, subsequent payment, fund transfer (switching between funds) and a loan to the policyholder are all not included as features of the contract. Other features that may not be available under the contract include earning liquidity, inheritance annuity payment rider, spousal contract continuation, shift to the Annuity Certain with waiting period, policyholder dividends and shift to whole life insurance coverage.

\* \* \*

The Fund Structure for the GMAB contract may be a balanced Fund of Funds with 3 Underlying Funds.

The 3 Funds may be 15% Japanese Equities and 25% Global Equities (with currency hedging), making up a 40% Equity portion of the Fund of Funds. The balance of the Fund of Funds may be 60% allocated to a Stable Bond Fund.

The Stable Bond Fund may be invested in, e.g., U.S. corporate bonds having a 10 year maturity (matching the deferral period of the contract) as well as Japanese government bonds of like maturity. Thus the Stable Bond Fund may be considered a duration match bond fund. The Stable Bond Fund may be actively managed rather than a conventional index bond fund.

The Subscription period for the contract/Fund may have a duration of half a year. The basis for the subscription period and the Balance Fund group is the application date.

The premium may be transferred into the special account from the general account at the beginning of the day immediately following the eighth day counting the contract issue date as Day One (or the immediately following business day, if the eighth day falls on a non-business day). Bonds having the required duration may be purchased for the fund as the premiums are received and transferred into the special account.

Policies with an effective contract date within the subscription period will buy separate account units reflecting a rebalanced fund. Because rebalancing stops after a defined period, those contracts with an effective date outside the stated fund subscription period will buy units of a balance fund that has started to drift.

No matter whether or not there is any contract issued during the rebalancing period, the rebalancing will be continued. In other words, even if there is no contract issued on the first business day of the subscription period, rebalancing will start on the eighth day (or the immediately following business day, if the eighth day is a non-business day) counting from that day. Even if there is no contract issued on the last business day of the subscription period, rebalancing will continue through the eighth day (or immediately following business day, if the eighth day is a non-business day) counting from that day.

The three underlying funds (Japan Equity 15%; Global Equity 25%; Stable Bond Fund 60%) will be rebalanced. This activity will be carried out at the balanced fund-of-funds level, by the fund issuer (which may be different from the contract issuer).

Duration of the subscription period will be the same regardless of the received premium amount and regardless of the identities of the distributors of the contracts.

A fund of the policy issued after the subscription period will be transferred to the Special Account which after drifting was started. In this case, the fund allocation may be changed from the initial 15/25/60 allocation.

Policies, which do not reach the profit lock target, will mature 10 years after issue date. (I.e., all policies in a fund cohort (group) will not have the same maturity date.)

\* \* \*

The contract may carry a front end load (FEL) of, e.g., 5% of the single premium. The FEL may be deducted from the single premium when the single premium is transferred into the special account. The FEL will be deducted at the end of the eighth day (or the following business day, if the eighth day falls on a non-business day) counting from the issue date.

The single premium amount for the FEL is as of the day of transfer to the special account. In case of a partial surrender before transfer to the special account, the amount subject to the FEL is the single premium less the partial surrender amount.

There may also be a mortality and expense (M&E) fee, which may be 2.65%, for example.

There may also be a fund management fee, which may vary from constituent fund to constituent fund but may be subject to a maximum such as 0.30%. There may be no CDSC. There may be an annuity maintenance fee of, e.g., 1% of the annuity amount.

* * *

Commissions for distributors of the contracts may be set in ranges by the age of the policyholder. There may be a charge back of the commission in case of full or partial surrender.

* * *

A death benefit before annuitization will be the greater of the BIA and the AV as of the day on which the insured dies. If an insured dies between the contract issue date and the eighth day from the contract issue date (or the business day immediately following the eighth day, if the eighth day falls on a non-business day), the amount equivalent to the BIA as of the day on which the insured dies will be paid as a death benefit.

Annuitization of the death benefit and deferred payment of the death benefit may be available under the contract. An accidental death benefit may not be available.

* * *

Full and partial surrender of the policy may be available before annuitization.

If the issuer accepts the request for full or partial surrender by the eighth day (or the business day immediately following the eighth day, if the eighth day falls on a non-business day) counting the contract issue date as Day One, the following amount will be returned to a customer as a cash surrender value: In case of a full surrender of a contract: an amount equivalent to BIA; in case of a partial surrender of a contract: a claimed partial surrender amount.

In the case of partial surrender before the transfer of a single premium into a special account, BIA after a partial surrender=(BIA before a partial surrender−a claimed partial surrender amount).

If the issuer accepts a request for a full or partial surrender after the transfer of a single premium into a special account, the following amount will be paid as a cash surrender amount. In case of a full surrender of a contract: an amount of the AV as of the surrender date; in the case of a partial surrender of a contract: a claimed partial surrender amount.

The AV after a partial surrender will be (AV before a partial surrender−Claimed partial surrender amount).

The BIA after a partial surrender will be (BIA before a partial surrender×{1−(Claimed partial surrender amount÷AV before a partial surrender)}).

In some embodiments, the minimum BIA after a partial surrender may be 1,000,000 yen, and a partial surrender may not be allowed if a BIA after a partial surrender would be below the minimum BIA.

In some embodiments, the minimum AV after a partial surrender may be 500,000 yen; and a partial surrender may not be allowed if an AV after a partial surrender would be below the minimum AV.

In some embodiments, the minimum claimed partial surrender amount may be 100,000 yen.

* * *

The type of annuity provided pursuant to the contract may be an Annuity Certain. The Annuity payout period may be 10 years. The Target Amount to be selected by the policyholder may be BIA×a Designated percentage. The Designated percentage may be, for example, in the range from 120% to 200%. In some embodiments, the policyholder may change the designated percentage, within the option range, only prior to the day immediately preceding the $5^{th}$ contract anniversary date.

The minimum annuity amount may be 100,000 yen. The maximum annuity amount may be 30,000,000 yen. If the annuity amount exceeds the maximum annuity amount, the annuity amount will be the maximum annuity amount and the excess portion may be paid to an annuity beneficiary on an Annuity Commencement Date (or rather the "shift date"—as defined below—if the AV hits the target amount) with a lump sum.

The annuity may be paid in installments, at the annuitant's or policyholder's option, 2, 4, 6 or 12 times a year. Annuities may be paid in installments with interest at a specific interest rate. If an amount after the split is less than 100,000 yen, the installment payments will not be available.

A succeeding Annuity Payment Rider may be available.

M&E may not be charged after the shift/annuitization. An annuity maintenance fee of 1% may be charged after an Annuity Commencement Date.

If the AV reaches the target amount between the $5^{th}$ anniversary date and the end of the day immediately preceding the $10^{th}$ anniversary date, the contract will be shifted to a 10 year Annuity Certain. The "shift date" is defined as the day on which the contract will be shifted to the Annuity Certain, which is the day immediately following the day on which the AV is equal to or exceeds the target amount. The AV may be compared with the target amount every business day. The entire AV as of the end of the day immediately preceding the shift date (the end of the day on which the AV is equal to or exceeds the target amount) will be switched from the special account to the general account at the beginning of the shift date. The Annuity amount is based on the AV as of the end of the day immediately preceding the shift date, divided by the annuity factor, determined using a specific interest rate as of the shift date. The Annuity Commencement Date is the day immediately following the day on which 30 days have passed since the shift date. A subsequent annuity payout date will be an annual anniversary date of an Annuity Commencement Date. An annuitant may change the annuity at the time of a shift. Upon the annuitant's request, an Annuity Commencement Date may be changed, at the time of the shift, to any day no later than the $10^{th}$ contract anniversary date. At the time of the shift, the options for the lengths of an annuity payout period are 5, 15 or 20 years. The age of an insured at the end of an annuity payout period should not exceed 100 years old. A lump sum payment of the annuity may be the amount equivalent to the present value of the annuities to be paid from the day on which the company accepts the claim in good order through the day on which an annuity payout period expires. A lump sum payment at the time of death will be the present value of the annuities to be paid from the time of an insured's death through the day on which an annuity payout period expires and will be paid to a succeeding annuity payee. Annuity payments, in lieu of a lump sum payment at the time of death, will be available, upon a request from a succeeding annuity payee.

\* \* \*

If AV does not reach the target amount through the day immediately preceding an Annuity Commencement Date, the contract will be shifted to the 10 year Annuity Certain. The amount of the Annuity fund will be calculated as {Max(AV at the end of the day immediately preceding an Annuity Commencement Date, BIA at the end of the day immediately preceding an Annuity Commencement Date)+(5%×BIA at the end of the day immediately preceding an Annuity Commencement Date)}. According to one example of application of this formula, if the BIA is 100 and the AV is 110, the Annuity fund would be 115. According to another example of application of this formula, if the BIA is 100 and the AV is 80, the Annuity fund would be 105. According to another example of application of this formula, if the BIA is 100 and the AV is 98, the Annuity fund would be 105. The Annuity amount is obtained by dividing the Annuity fund amount by an annuity factor calculated using a specific interest rate as of the Annuity Commencement Date. The Annuity Commencement Date may be the $10^{th}$ anniversary contract date. A subsequent annuity payout date may be an annual anniversary date of an Annuity Commencement Date. An annuitant may change the annuity type at the time of a shift. At the time of the shift, the options for the lengths of an annuity payout period are 5, 15 or 20 years. The age of an insured at the end of an annuity payout period should not exceed 100 years old. A lump sum payment of the annuity may be the amount equivalent to the present value of the annuities to be paid from the day on which the company accepts the claim in good order through the day on which an annuity payout period expires. A lump sum payment at the time of death will be the present value of the annuities to be paid from the time of an insured's death through the day on which an annuity payout period expires and will be paid to a succeeding annuity payee. Annuity payments, in lieu of a lump sum payment at the time of death, will be available, upon a request from a succeeding annuity payee.

Two types of annuity may be available after the shift: A Whole Life Annuity with Guaranteed Period or a Spousal Annuity with Guaranteed Period. In either case, the following may apply:

The minimum annuity amount may be 100,000 yen. The maximum annuity amount may be 30,000,000 yen. If the annuity amount exceeds the maximum annuity amount, the annuity amount will be the maximum annuity amount and the excess portion may be paid to an annuity beneficiary on an Annuity Commencement Date (or rather the "shift date", if the AV hits the target amount) with a lump sum.

The annuity may be paid in installments, at the annuitant's or policyholder's option, 2, 4, 6 or 12 times a year. Annuities may be paid in installments with interest at a specific interest rate. If an amount after the split is less than 100,000 yen, the installment payments will not be available.

A succeeding Annuity Payment Rider may be available.

For a Whole Life Annuity with Guaranteed Period, the Annuity Commencement Age may be 40 to 90 years old. The Guaranteed period may be 5, 10, 15, or 20 years and an insured should not exceed 100 years old at the end of the guaranteed period. It may be a condition for the annuity payments that an insured be alive on the annuity payout dates.

For a lump sum payment of this type of annuity, if the issuer accepts the request for a lump sum payment of annuities on or after the shift date and prior to the Annuity Commencement Date, the amount to be paid may be an amount equivalent to the policy reserve, and the policy may terminate, but if the issuer accepts the request for a lump sum payment of annuities on or after the Annuity Commencement Date and prior to the last annuity payout date of the guaranteed period, the amount to be paid may be an amount equivalent to the present value of the annuities to be paid during the remaining guaranteed period, and if the insured is alive at the end of the guaranteed period, annuity payout may resume. For a lump sum payment at the time of death for this type of annuity, if an insured dies on or after the shift date and prior to the ACD, the amount to be paid may be an amount equivalent to the policy reserve, and continuing payment of annuities may not be available; and if an insured dies on or after the Annuity Commencement Date and prior to the final annuity payout date of the guaranteed period, the amount to be paid may be an amount equivalent to the present value of the annuities to be paid during the remaining guaranteed period, and continuing payment of the annuity may be available.

For a Spousal Annuity with Guaranteed Period, the Annuitization Age may be 40 to 90 years old (with the age difference between the insured and his/her spouse not to exceed 15 years). The Guaranteed period may be 5, 10, 15, or 20 years and an insured should not exceed 100 years old at the end of the guaranteed period. It may be a condition for the annuity payments that an insured or his/her spouse be alive on the annuity payout dates. For a lump sum payment of this type of annuity, if the issuer accepts the request for a lump sum payment of annuities on or after the shift date and prior to the Annuity Commencement Date, the amount to be paid may be an amount equivalent to the policy reserve, and the policy may terminate, but if the issuer accepts the request for a lump sum payment of annuities on or after the Annuity Commencement Date and prior to the last annuity payout date of the guaranteed period, the amount to be paid may be an amount equivalent to the present value of the annuities to be paid during the remaining guaranteed period, and if the insured or his/her spouse is alive at the end of the guaranteed period, annuity payout may resume. For a lump sum payment at the time of death for this type of annuity, if both an insured and his/her spouse are dead on or after the shift date and prior to the ACD, the amount to be paid may be an amount equivalent to the policy reserve, and continuing payment of annuities may not be available; and if both an insured and his/her spouse are dead on or after the Annuity Commencement Date and prior to the final annuity payout date of the guaranteed period, the amount to be paid may be an amount equivalent to the present value of the annuities to be paid during the remaining guaranteed period, and continuing payment of the annuity may be available.

An annuity amount after an insured or his/her spouse dies and after the end of the guaranteed period will be either 100% or 60% of the initial annuity amount.

In the particular examples described above, the FEL is at 5%. Alternatively, the FEL may be in the range of 3% to 7%.

In the particular examples described above, the M&E fee is at 2.65%. Alternatively, the M&E fee may be in the range of 1% to 3%.

\* \* \*

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A guaranteed minimum accumulated benefit (GMAB) variable annuity contract management apparatus comprising:
    a contract data storage unit for registering contract data on GMAB variable annuity contracts having a predetermined contract duration and entered into between policyholders and an insurance company during a subscription period;
    a fund data storage unit for registering fund data on amounts paid by the policyholders to purchase the contracts;
    a bond fund data processor for computing a portion of the amounts paid to be allocated to a bond fund;
    a bond fund data storage unit for registering data on the portion of the amounts paid to be allocated to the bond fund; and
    a bond purchase data storage unit for registering data on selected bonds having (i) a maturity date that matches the predetermined contract duration of the GMAB variable annuity contracts and (ii) an aggregate value that substantially matches the portion of the amounts paid to be allocated to the bond fund.

2. The GMAB variable annuity contract management apparatus according to claim 1, wherein said portion of the amounts paid to be allocated to the bond fund is in the range of substantially 40% to 60% of said amounts paid.

3. The GMAB variable annuity contract management apparatus according to claim 2, wherein said portion of the amounts paid to be allocated to the bond fund is substantially 60% of said amounts paid.

4. The GMAB variable annuity contract management apparatus according to claim 2, further comprising:
    an equity fund data processor for computing a portion of the amounts paid to be allocated to an equity fund; and
    an equity fund data storage unit for registering data on the portion of the amounts paid to be allocated to the equity fund, the equity fund comprising (a) a local equities fund in an amount in a range of substantially 10% to 30% of the amounts paid by the policyholders to purchase the contracts, and (b) a worldwide equities fund in an amount in a range of substantially 10% to 30% of the amounts paid by the policyholders to purchase the contracts.

5. The GMAB variable annuity contract management apparatus according to claim 1, further comprising:
    a target amount data processor for comparing an actual value of each of at least some of said contracts with a target amount designated by a respective policyholder under said each contract; and
    a contract shift data processor for responding to the target amount data processor by shifting said each contract to an annuity certain if the actual value of said each contract at least matches said target amount.

6. The GMAB variable annuity contract management apparatus according to claim 5, wherein said target amount is in a range of 110% to 200% of an amount paid by said policyholder to purchase said each contract.

7. The GMAB variable annuity contract management apparatus according to claim 5, wherein said contract shift data processor shifts said each contract to an annuity certain only in a period of time from a halfway point of the duration of said each contract to a maturity date of said each contract.

8. The GMAB variable annuity contract management apparatus according to claim 7, wherein said predetermined duration of the GMAB variable annuity contracts is in a range from 5 to 15 years.

9. The GMAB variable annuity contract management apparatus according to claim 1, further comprising:
    a guaranteed minimum benefit data processor for computing a guaranteed minimum benefit for said contracts on a maturity date of said contracts.

10. The GMAB variable annuity contract management apparatus of claim 9, wherein said guaranteed minimum benefit is 105% of an amount paid by a respective policyholder to purchase each of said contracts.

11. A guaranteed minimum accumulated benefit (GMAB) variable annuity contract management method, comprising:
    registering, in a contract data storage unit, contract data on GMAB variable annuity contracts having a predetermined contract duration and entered into between policyholders and an insurance company during a subscription period;
    registering, in a fund data storage unit, fund data on amounts paid by the policyholders to purchase the contracts;
    computing, in a bond fund data processor a portion of the amounts paid to be allocated to a bond fund;
    registering, in a bond fund data storage unit, data on the portion of the amounts paid to be allocated to the bond fund; and
    registering, in a bond purchase data storage unit, data on selected bonds having (i) a maturity date that matches the predetermined contract duration of the GMAB variable annuity contracts and (ii) an aggregate value that substantially matches the portion of the amounts paid to be allocated to the bond fund.

12. The GMAB variable annuity contract management method according to claim 11, wherein said portion of the amounts paid to be allocated to the bond fund is in the range of substantially 40% to 60% of said amounts paid.

13. The GMAB variable annuity contract management method according to claim 12, wherein said portion of the amounts paid to be allocated to the bond fund is substantially 60% of said amounts paid.

14. The GMAB variable annuity contract management method according to claim 11, further comprising:
    operating a target amount data processor to compare an actual value of each of at least some of said contracts with a target amount designated by a respective policyholder under said each contract; and
    operating a contract shift data processor to generate a response to the target amount data processor by shifting said each contract to an annuity certain if the actual value of said each contract at least matches said target amount.

15. The GMAB variable annuity contract management method according to claim 14, wherein said target amount is in a range of 110% to 200% of an amount paid by said policyholder to purchase said each contract.

16. The GMAB variable annuity contract management method according to claim 14, wherein said registering, in a contract data storage unit, contract data is performed only in a period of time from a halfway point of the duration of said each contract to a maturity date of said each contract.

17. A guaranteed minimum accumulated benefit (GMAB) variable annuity contract management program, comprising:
    registering, in a contract data storage unit, contract data on GMAB variable annuity contracts having a predetermined contract duration and entered into between policyholders and an insurance company during a subscription period;

registering, in a fund data storage unit, fund data on amounts paid by the policyholders to purchase the contracts;

computing, in a bond fund data processor, a portion of the amounts paid to be allocated to a bond fund;

registering, in a bond fund data storage unit, data on the portion of the amounts paid to be allocated to the bond fund; and registering, in a bond purchase data storage unit, data on selected bonds having (i) a maturity date that matches the predetermined contract duration of the GMAB variable annuity contracts and (ii) an aggregate value that substantially matches the portion of the amounts paid to be allocated to the bond fund.

18. The GMAB variable annuity contract management program according to claim 17, wherein said portion of the amounts paid to be allocated to the bond fund is in the range of substantially 40% to 60% of said amounts paid.

19. The GMAB variable annuity contract management program according to claim 18, wherein said portion of the amounts paid to be allocated to the bond fund is substantially 60% of said amounts paid.

20. The GMAB variable annuity contract management program according to claim 17, further comprising:

operating a target amount data processor to compare an actual value of each of at least some of said contracts with a target amount designated by a respective policyholder under said each contract; and operating a contract shift data processor in response to the target amount data processor by shifting said each contract to an annuity certain if the actual value of said each contract at least matches said target amount.

21. The GMAB variable annuity contract management program according to claim 20, wherein said target amount is in a range of 110% to 200% of an amount paid by said policyholder to purchase said each contract.

22. The GMAB variable annuity contract management program according to claim 16, wherein said operating said contract shift data processor is performed only in a period of time from a halfway point of the duration of said each contract to a maturity date of said each contract.

23. A computer-readable recording medium on which is recorded a guaranteed minimum accumulated benefit (GMAB) variable annuity contract management program, the program comprising:

registering, in a contract data storage unit, contract data on GMAB variable annuity contracts having a predetermined contract duration and entered into between policyholders and an insurance company during a subscription period;

registering, in a fund data storage unit, fund data on amounts paid by the policyholders to purchase the contracts;

operating a bond fund data processor to compute a portion of the amounts paid to be allocated to a bond fund;

registering, in a bond fund data storage unit, data on the portion of the amounts paid to be allocated to the bond fund; and registering, in a bond purchase data storage unit, data on selected bonds having (i) a maturity date that matches the predetermined contract duration of the GMAB variable annuity contracts and (ii) an aggregate value that substantially matches the portion of the amounts paid to be allocated to the bond fund.

24. The computer-readable recording medium according to claim 23, wherein said portion of the amounts paid to be allocated to the bond fund is in the range of substantially 40% to 60% of said amounts paid.

25. The computer-readable recording medium according to claim 24, wherein said portion of the amounts paid to be allocated to the bond fund is substantially 60% of said amounts paid.

26. The computer-readable recording medium according to claim 23, wherein the GMAB variable annuity contract management program further comprises:

operating a target amount data processor to compare an actual value of each of at least some of said contracts with a target amount designated by a respective policyholder under said each contract; and operating a contract shift data processor in response to the target amount data processor by shifting said each contract to an annuity certain if the actual value of said each contract at least matches said target amount.

27. The computer-readable recording medium according to claim 26, wherein said target amount is in a range of 110% to 200% of an amount paid by said policyholder to purchase said each contract.

28. The computer-readable recording medium according to claim 26, wherein said operating said contract shift data processor is performed only in a period of time from a halfway point of the duration of said each contract to a maturity date of said each contract.

* * * * *